US010408096B2

(12) United States Patent
Pluta et al.

(10) Patent No.: US 10,408,096 B2
(45) Date of Patent: *Sep. 10, 2019

(54) ENGINE VARIABLE CAMSHAFT TIMING PHASER WITH PLANETARY GEAR SET

(71) Applicant: BorgWarner Inc., Auburn Hills, MI (US)

(72) Inventors: Christopher J. Pluta, Lansing, NY (US); Michael W. Marsh, Dryden, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,816

(22) Filed: Nov. 6, 2017

(65) Prior Publication Data

US 2018/0320564 A1  Nov. 8, 2018

Related U.S. Application Data

(63) Continuation of application No. 15/511,667, filed on Mar. 16, 2017, now Pat. No. 9,810,109.

(51) Int. Cl.
*F01L 1/34* (2006.01)
*F01L 1/352* (2006.01)
(Continued)

(52) U.S. Cl.
CPC ............ *F01L 1/352* (2013.01); *F16H 35/008* (2013.01); *F16H 57/082* (2013.01);
(Continued)

(58) Field of Classification Search
CPC ... F01L 1/352; F01L 2250/04; F01L 2250/06; F01L 2820/032; F16H 1/28; F16H 35/008; F16H 57/082; F16H 2001/2872
See application file for complete search history.

(56) References Cited

U.S. PATENT DOCUMENTS 7,506,623 B2   3/2009  Schaefer et al.
9,810,109 B2 * 11/2017  Pluta ................. F01L 1/352
(Continued)

FOREIGN PATENT DOCUMENTS

DE   102005018956 A1   11/2006
DE   102012203984 A1    9/2013
(Continued)

OTHER PUBLICATIONS

First Office Action for PCT/US2015/049291/DE112015003817.5 dated Jul. 5, 2017, by the German Patent and Trademark Office.
(Continued)

*Primary Examiner* — Zelalem Eshete
(74) *Attorney, Agent, or Firm* — Thomas F. Quinn, Jr.

(57) ABSTRACT

An engine variable camshaft timing phaser (10) includes a sprocket (12), three ring gears (26, 28, 30), multiple planet gears (24), and a sun gear (22). The sprocket (12) receives rotational drive input from an engine crankshaft. One or more of the three ring gear(s) (26, 28, 30) receives rotational drive input from the sprocket (12) and rotates with the sprocket (12), and the remaining ring gear(s) (26, 28, 30) transmit rotational drive output to an engine camshaft (62). All three of the ring gears (26, 28, 30) engage with the planet gears (24). And the sun gear (22) also engages with the planet gears (24). In operation, relative rotational speeds between the sprocket (12) and the sun gear (22) causes the engine camshaft (62) to advance or retard engine valve opening and closing.

15 Claims, 5 Drawing Sheets

(51) Int. Cl.
*F16H 57/08* (2006.01)
*F16H 35/00* (2006.01)
*F16H 1/28* (2006.01)

(52) U.S. Cl.
CPC ....... *F01L 2250/02* (2013.01); *F01L 2250/04* (2013.01); *F01L 2250/06* (2013.01); *F01L 2820/032* (2013.01); *F16H 1/28* (2013.01); *F16H 2001/2872* (2013.01)

(56) References Cited

U.S. PATENT DOCUMENTS

2001/0020460 A1  9/2001  Heer
2006/0236965 A1  10/2006  Schaefer et al.
2015/0315939 A1  11/2015  Showalter

FOREIGN PATENT DOCUMENTS

| EP | 2006501 A1 | 12/2008 |
| WO | 03056141 A1 | 7/2003 |
| WO | 2014092963 A1 | 6/2014 |

OTHER PUBLICATIONS

International Search Report for PCT/US2015/049291 dated Nov. 25, 2015.

\* cited by examiner

ENGINE VARIABLE CAMSHAFT TIMING PHASER WITH PLANETARY GEAR SET

This application is a continuation under 35 USC 120 of U.S. application Ser. No. 15/511,667 filed Mar. 16, 2017, the entire contents of which are hereby incorporated by reference. This application claims the benefit of PCT/US2015/049291 filed Sep. 10, 2015 and U.S. Provisional Ser. No. 62/051,514 filed on Sep. 17, 2014, the entire contents of which are hereby incorporated by reference.

TECHNICAL FIELD

The present disclosure generally relates to variable valve timing (VVT) for internal combustion engines, and more particularly relates to variable camshaft timing (VCT) phasers.

BACKGROUND

Variable valve timing (VVT) systems are commonly used with internal combustion engines—such as those found in automobiles—for controlling intake and exhaust valve opening and closing. The VVT systems can help improve fuel economy, reduce exhaust emissions, and enhance engine performance. One type of VVT system employs a variable camshaft timing (VCT) phaser. In general, VCT phasers dynamically adjust the rotation of engine camshafts relative to engine crankshafts in order to advance or retard the opening and closing movements of intake and exhaust valves.

SUMMARY

In one embodiment, an engine variable camshaft timing phasing includes a sprocket, a first ring gear, multiple planet gears, a sun gear, a second ring gear, and a third ring gear. The sprocket receives rotational drive input from an engine crankshaft. The first ring gear receives rotational drive input from the sprocket. Each of the planet gears is engaged with the first ring gear. The sun gear is engaged with each of the planet gears and is driven by an electric motor. The second ring gear is engaged with each of the planet gears, and the third ring gear is engaged with each of the planet gears. In operation, relative rotational movements between the sprocket and the sun gear caused by the electric motor advances or retards the accompanying engine valve opening and closing.

In another embodiment, an engine variable camshaft timing phaser includes a sprocket, three ring gears, multiple planet gears, and a sun gear. One or more of the ring gear(s) receives rotational drive input from the sprocket. Each of the planet gears is engaged with all three of the ring gears. And the sun gear is engaged with each of the planet gears. Loads transmitted to each of the planet gears from the ring gears are substantially balanced across an axial extent of each of the planet gears. The substantially balanced loads preclude misalignment of the planet gears relative to the ring gears.

In yet another embodiment, an engine variable camshaft timing phaser includes a sprocket, a first ring gear, multiple planet gears, a sun gear, a second ring gear, a third ring gear, and a plate. The sprocket receives rotational drive input from an engine crankshaft. The first ring gear receives rotational drive input from the sprocket. Each of the planet gears makes teeth-to-teeth meshing with the first ring gear. The sun gear makes teeth-to-teeth meshing with each of the planet gears, and the sun gear is driven by an electric motor. The second ring gear makes teeth-to-teeth meshing with each of the planet gears, and the third ring gear makes teeth-to-teeth meshing with each of the planet gears. The plate receives rotational drive input from the second ring gear and receives rotational drive input from the third ring gear. The plate transmits rotational drive output to an engine camshaft. The first ring gear and each of the planet gears mesh at a first axial section of each of the planet gears. Similarly, the second ring gear and each of the planet gears mesh at a second axial section of each of the planet gears. And the third ring gear and each of the planet gears mesh at a third axial section of each of the planet gears. The first axial section of each of the planet gears is situated in-between the second and third axial sections of each of the planet gears. In operation, in order to angularly displace the engine camshaft in a first direction relative to the sprocket, the electric motor drives the sun gear at a greater rotational speed than the rotational speed of the sprocket. And in order to angularly displace the engine camshaft in a second direction relative to the sprocket, the electric motor drives the sun gear at a lesser rotational speed than the sprocket.

DETAILED DESCRIPTION

Figure 1:
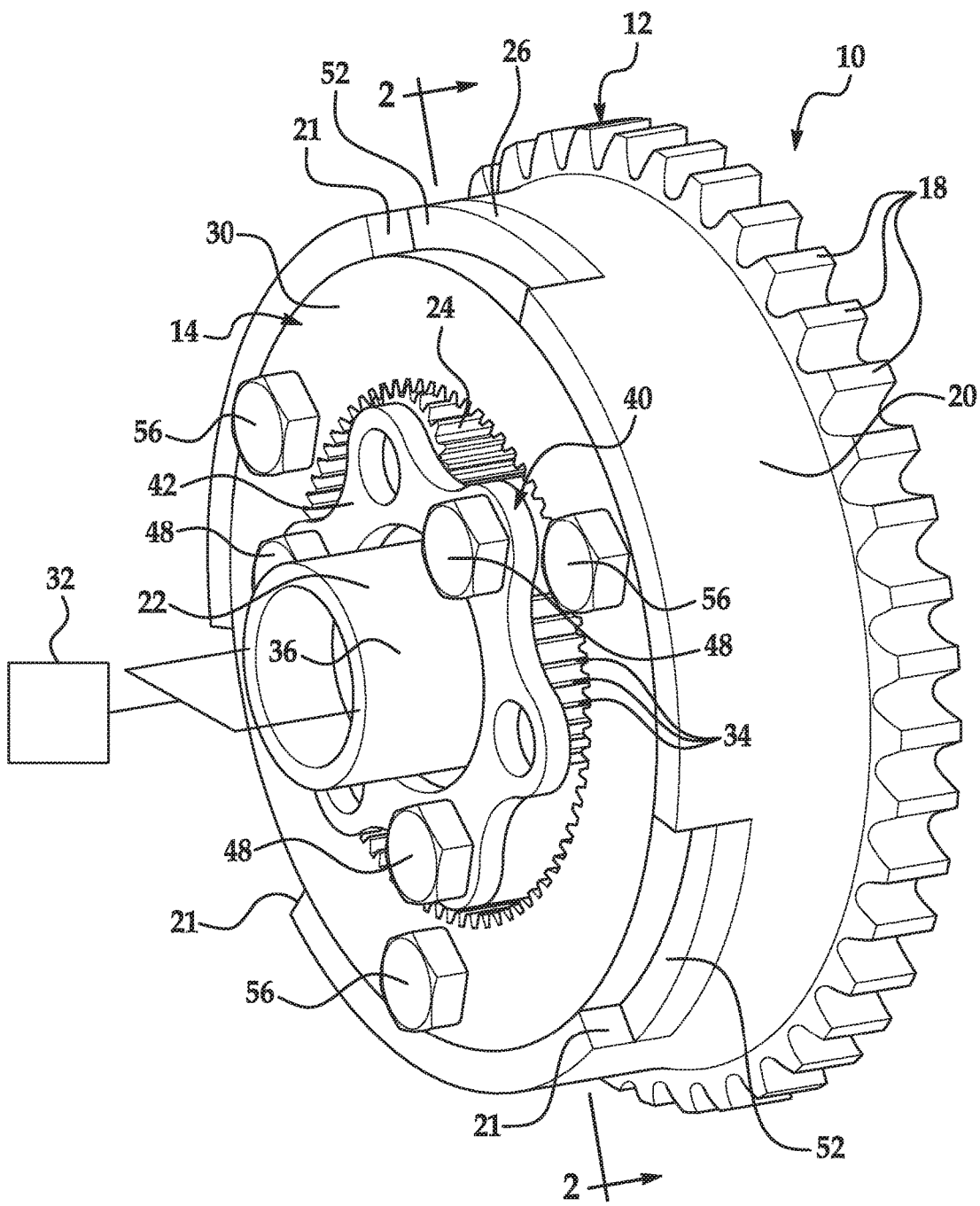
FIG. 1 is a perspective view of an embodiment of an engine variable camshaft timing phaser.

The figures illustrate embodiments of a variable camshaft timing phaser 10 (hereafter "phaser") that is equipped in an internal combustion engine for controlling intake and exhaust valve opening and closing in the engine. More particularly, the phaser 10 dynamically adjusts the rotation of the engine's camshaft relative to the engine's crankshaft in order to advance or retard the opening and closing movements of the intake and exhaust valves. Internal combustion engines are perhaps most commonly found in automobiles, but are also found in other applications. While described in greater detail below, in general the phaser 10 has a planetary gear set with three ring gears that more readily balance loads across planet gears and hence preclude misalignment of the planet gears. In some instances this means that a carrier assembly for supporting the planet gears may be omitted. As an aside, the terms axially, radially, circumferentially, and their related forms are used herein with reference to the generally circular and annular and cylindrical components of the phaser 10, unless otherwise indicated.

The phaser 10 is a multi-piece assembly with components that work together to transfer rotation from the accompanying engine's crankshaft and to the engine's camshaft, and that can work together to angularly displace the camshaft relative to the crankshaft for advancing and retarding engine valve opening and closing. The phaser 10 can have different designs and constructions depending upon, among other factors, the application in which the phaser is employed, production and manufacturing considerations and capabilities, and the crankshaft and camshaft that it works with. In the embodiment presented in FIGS. 1 and 2, for example, the phaser 10 includes a sprocket 12, a planetary gear set 14, and a plate 16.

The sprocket 12 receives rotational drive input from the engine's crankshaft and rotates about an axis $X_1$. A timing chain or a timing belt can be looped around the sprocket 12 and around the crankshaft so that rotation of the crankshaft translates into rotation of the sprocket via the chain or belt. Other techniques for transferring rotation between the sprocket 12 and crankshaft are possible. At an exterior, the sprocket 12 has a set of teeth 18 for mating with the timing chain, with the timing belt, or with another component. In different examples, the set of teeth 18 can include thirty-eight individual teeth, forty-two individual teeth, or some other quantity of teeth spanning continuously around the circumference of the sprocket 12. In the embodiment presented here, the sprocket 12 has a housing 20 spanning axially from the set of teeth 18. The housing 20 is a cylindrical wall that surrounds parts of the planetary gear set 14. Near its terminal and open end, the housing 20 has several cutouts 21 that are spaced circumferentially therearound.

Figure 2:
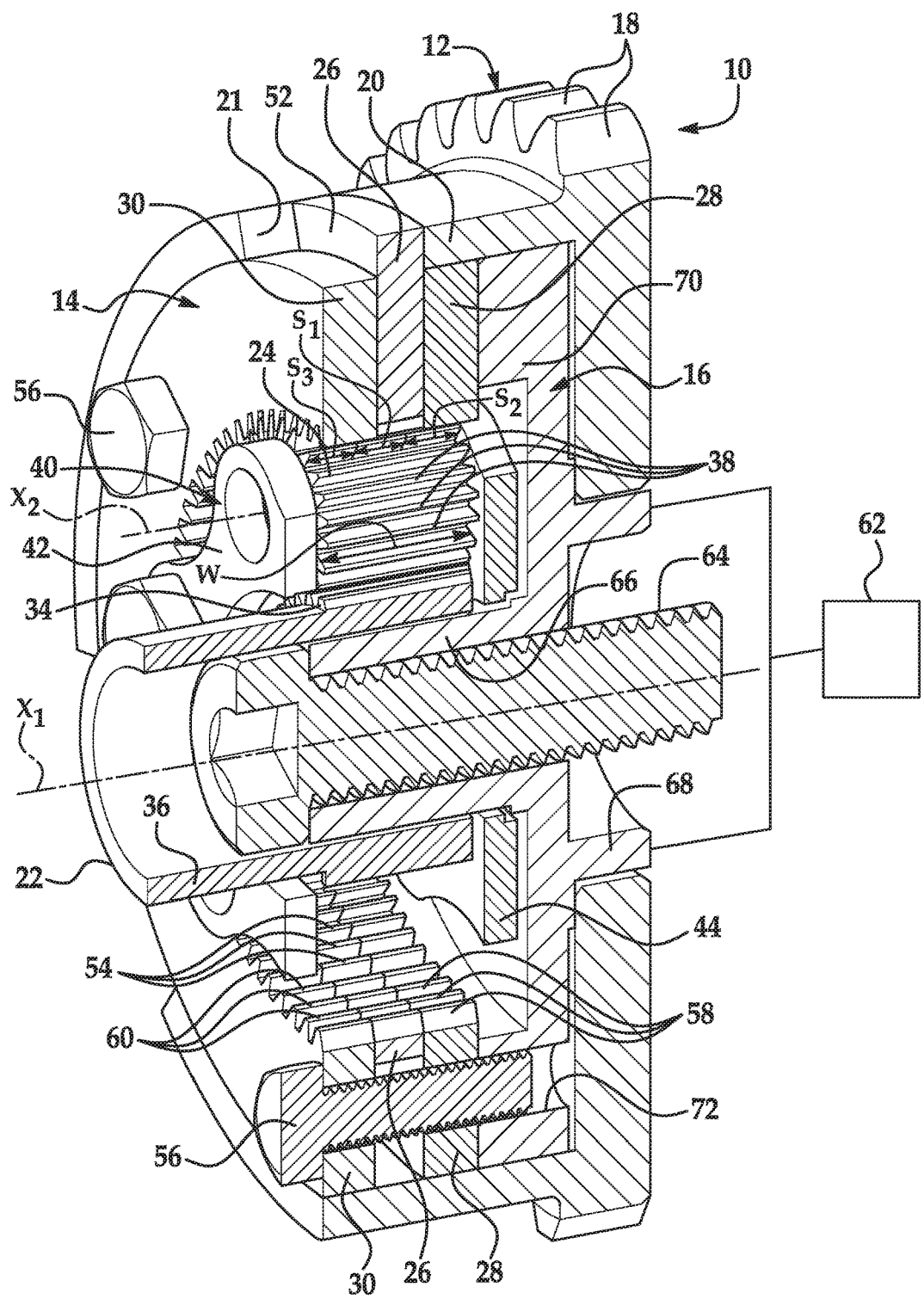
FIG. 2 is a sectional view of the engine variable camshaft timing phaser of FIG. 1, taken at arrows 2-2 in FIG. 1.

Still referring to FIGS. 1 and 2, the planetary gear set 14 includes a sun gear 22, planet gears 24, a first ring gear 26, a second ring gear 28, and a third ring gear 30. The sun gear 22 is connected to an electric motor 32 (FIG. 1) and is driven by the electric motor for rotation about the axis $X_1$. The connection between the sun gear 22 and the electric motor 32 can be made in a way that transmits rotation from the electric motor to the sun gear; a pin and slot is one example of such a connection. The sun gear 22 engages with the planet gears 24 and has a set of teeth 34 at its exterior for making direct teeth-to-teeth meshing with the planet gears. In different examples, the set of teeth 34 can include twenty-six individual teeth, thirty-seven individual teeth, or some other quantity of teeth spanning continuously around the circumference of the sun gear 22. In the embodiment presented here, the sun gear 22 is an external spur gear, but could be another type of gear. A cylindrical wall 36 spans from the set of teeth 34 for interconnecting with the electric motor 32.

As described in greater detail below, the planet gears 24 rotate about their individual rotational axes $X_2$ when in the midst of bringing the engine's camshaft to and from its advanced and retarded angular positions. When not advancing or retarding, the planet gears 24 revolve together around the axis $X_1$ with the sun gear 22 and with the ring gears 26, 28, 30. In the embodiment presented here, there are a total of three discrete planet gears 24 that are similarly designed and constructed with respect to one another, but there could be other quantities of planet gears such as two or four or six. However many there are, each of the planet gears 24 can engage with all three of the first, second, and third ring gears 26, 28, 30, and each planet gear can have a set of teeth 38 at its exterior for making direct teeth-to-teeth meshing with the ring gears. In different examples, the set of teeth 38 can include twenty-one individual teeth, or some other quantity of teeth spanning continuously around the circumference of each of the planet gears 24. The set of teeth 38 at each planet gear 24 spans axially across the respective planet gear for an axial width W. The teeth 38 can extend fully across the total axial extent of each planet gear 24 as illustrated, though need not.

Figure 6:
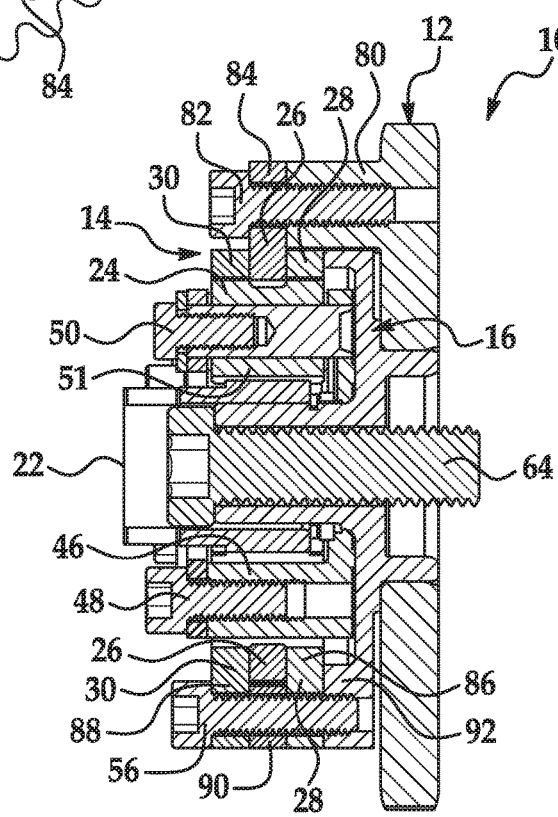
FIG. 6 is a sectional view of the engine variable camshaft timing phaser of FIG. 3, taken at arrows 6-6 in FIG. 5.

To hold the planet gears 24 in place at the interior of the phaser 10, a carrier assembly 40 may be provided. But as set forth below, in some embodiments the carrier assembly 40 may be omitted. When provided, the carrier assembly 40 can include a first plate 42 at one end, a second plate 44 at the other end, and cylinders 46 linking the plates for making a connection between them—these items are perhaps depicted best in FIG. 4. Bolts 48 fasten with internal threads of the cylinders 46, and bolts 50 fasten with pins 51 (FIG. 6) that mount the planet gears 24 and serve as a hub. And although not illustrated, washers can be inserted in-between the components of the carrier assembly 40. Still, in other embodiments not depicted, the first and second plates could be matching halves that come together for connection without discrete cylinders, or the first and second plates could be unitary extensions of each other.

Referring now particularly to FIG. 2, the first ring gear 26 receives rotational drive input from the sprocket 12 so that the first ring gear and sprocket rotate together about the axis $X_1$ in operation. In this embodiment, the first ring gear 26 and sprocket 12 are connected together. The connection can be made in different ways, including by the example illustrated in FIGS. 1 and 2 with the cutouts 21 and tabs 52. The tabs 52 are radially-outwardly projections of the first ring gear 26 and are inserted into the cutouts 21. For every cutout 21, there can be corresponding tab 52. Still, other connections could involve bolts, rivets, and/or welds, or the first ring gear 26 could be a unitary extension of the sprocket 12. The phrases "rotational drive input" and "rotational drive output" as used herein are intended to encompass these connection and unitary possibilities. The first ring gear 26 engages with the planet gears 24 and has a set of teeth 54 at its interior for making direct teeth-to-teeth meshing with the planet gears 24. The teeth 54 mesh with the teeth 38 of the planet gears 24 along a first axial section $S_1$ of each planet gear. Unlike previously-described sets of teeth, the set of teeth 54 project radially-inwardly relative to the annular and disk-like shape of the first ring gear 26. In different examples, the set of teeth 54 can include eighty individual teeth, or some other quantity of teeth spanning continuously around the circumference of the first ring gear 26. In the embodiment presented here, the first ring gear 26 is an internal spur gear, but could be another type of gear. And in installation, the first ring gear 26 is sandwiched axially between the second and third ring gears 28, 30, and is in this sense the middle ring gear.

The second ring gear 28 is connected to the plate 16 and drives rotation of the plate about the axis $X_1$. The connection can be made in different ways, including by the example of FIGS. 1 and 2 with bolts 56. There can be three bolts 56 fastened through the second ring gear 28 and into the plate 16 and spaced around their circumferences. Still, as before, other connections could involve more or less bolts, rivets, and/or welds, or the second ring gear 28 could be a unitary extension of the plate 16. The second ring gear 28 engages with the planet gears 24 and has a set of teeth 58 at its interior for making direct teeth-to-teeth meshing with the planet gears. The teeth 58 mesh with the teeth 38 of the planet gears 24 along a second axial section $S_2$ of each planet gear. The set of teeth 58 project radially-inwardly relative to the annular and disk-like shape of the second ring gear 28. In different examples, the set of teeth 58 can include seventy-seven individual teeth, or some other quantity of teeth spanning continuously around the circumference of the second ring gear 28. With respect to each other, the number of teeth between the first and second ring gears 26, 28 can differ by a multiple of the number of planet gears 24. So for instance, the set of teeth 54 can include eighty individual teeth, while the set of teeth 58 can include seventy-seven individual teeth—a difference of three individual teeth for the three planet gears 24 in this example. In another example with six planet gears, the set of teeth 54 could include seventy individual teeth, while the set of teeth 58 could include eighty-two individual teeth. Satisfying this relationship furnishes the advancing and retarding capabilities by imparting relative rotational movement and relative speed between the first and second ring gears 26, 28. In the embodiment presented here, the second ring gear 28 is an internal spur gear, but could be another type of gear. And in installation as shown best in FIG. 2, the second ring gear 28 is situated on the camshaft-side of the phaser 10 relative to the other two ring gears 26, 30.

Like the second ring gear 28, the third ring gear 30 is connected to the plate 16 and drives rotation of the plate about the axis $X_1$. The connection can be made in different ways, including by the example of FIGS. 1 and 2 with the bolts 56. As before, the bolts 56 fasten through the third ring gear 30 and into the plate 16; the bolts 56 do not fasten through the first ring gear 26 as shown in FIG. 2. Still, as before, other connections could involve more or less bolts, rivets, and/or welds, or the third ring gear 30 could be a unitary extension of the plate 16. The third ring gear 30 may be similarly designed and constructed as the second ring gear 28. The third ring gear 30 engages with the planet gears 24 and has a set of teeth 60 at its interior for making direct teeth-to-teeth meshing with the planet gears. The teeth 60 mesh with the teeth 38 of the planet gears 24 along a third axial section $S_3$ of each planet gear. The set of teeth 60 project radially-inwardly relative to the annular and disk-like shape of the third ring gear 30. The set of teeth 60 can include seventy-seven individual teeth, or some other quantity of teeth spanning continuously around the circumference of the third ring gear 30; the number of teeth for the third ring gear can be the same as that for the second ring gear 28. And as before, the number of teeth between the first and third ring gears 26, 30 can differ by a multiple of the number of planet gears 24. In the embodiment presented here, the third ring gear 30 is an internal spur gear, but could be another type of gear. And in installation as depicted best in FIG. 1, the third ring gear 30 is situated on the electric-motor-side of the phaser 10 relative to the other two ring gears 26, 28.

Together, the three ring gears 26, 28, 30 constitute a split ring gear construction for the planetary gear set 14.

Referring now particularly to FIG. 2, the plate 16 can be connected to an engine camshaft 62 and drives rotation of the camshaft about the axis $X_1$. The connection can be made in different ways, including by way of a bolt 64. As set forth above, the plate 16 can also be connected to the second and third ring gears 28, 30 via the bolts 56. In the embodiment presented here, the plate 16 has a first sleeve portion 66, a second sleeve portion 68, and a flange portion 70. The first sleeve portion 66 is a cylindrical wall that is inserted into the cylindrical wall 36 of the sun gear 22 and that receives the bolt 64. The first sleeve portion 66 and cylindrical wall 36 can be slightly spaced apart from each other so they can independently rotate. The second sleeve portion 68 can guide connection with the engine camshaft 62. And the flange portion 70 can resemble a disk, and has three bolt holes 72 that are internally threaded for fastening with the bolts 56.

When put in use, the phaser 10 transfers rotation from the engine crankshaft and to the engine camshaft 62, and, when commanded by a controller, can angularly displace the camshaft with respect to its normal operating position to an advanced angular position and to a retarded angular position. Under normal operation and without valve advancing or retarding, the sprocket 12 is driven to rotate about the axis $X_1$ by the engine crankshaft in a first direction (e.g., clockwise or counterclockwise) and at a first rotational speed. Since the first ring gear 26 is connected to the sprocket 12, the first ring gear also rotates in the first direction and at the first rotational speed. Concurrently, the electric motor 32 drives the sun gear 22 to rotate about the axis $X_1$ in the first direction and at the first rotational speed. With these conditions, the sprocket 12, sun gear 22, first and second and third ring gears 26, 28, 30, and plate 16 all rotate together in unison in the first direction and at the first rotational speed. Also, the planet gears 24 revolve together around the axis $X_1$ in the first direction and at the first rotational speed, and do not rotate about their individual rotational axes $X_2$. Put differently, there is no relative rotational movement or relative rotational speed among the sprocket 12, sun gear 22, planet gears 24, ring gears 26, 28, 30, and plate 16 in normal operation. Due to this lack of relative rotational movement and speed, frictional losses that may otherwise occur between the gears are minimized or altogether eliminated.

In one example, in order to bring the engine camshaft 62 to the advanced angular position, the electric motor 32 drives the sun gear 22 momentarily at a second rotational speed that is slower than the first rotational speed of the sprocket 12. This causes relative rotational movement and relative rotational speed between the sun gear 22 and sprocket 12. And because the second and third ring gears 28, 30 have a different number of individual teeth with respect to the first ring gear 26, the second and third ring gears move rotationally relative to the first ring gear. At the same time, the planet gears 24 rotate about their individual rotational axes $X_2$. The exact duration of driving the sun gear 22 at the second rotational speed will depend on the desired degree of angular displacement between the engine camshaft 62 and the sprocket 12. Once the desired degree of angular displacement is effected, the electric motor 32 will once again be commanded to drive the sun gear 22 at the first rotational speed. The engine camshaft 62 hence remains at the advanced angular position while the sun gear 22 is driven at the first rotational speed under these conditions.

Conversely, to bring the engine camshaft 62 to the retarded angular position from the normal operating position, the electric motor 32 drives the sun gear 22 momentarily at a third rotational speed that is faster (contrary to the second rotational speed) than the first rotational speed of the sprocket 12. Relative rotational movements and speeds are once again caused between the sun gear 22 and sprocket 12, and between the second and third ring gears 28, 30 and the first ring gear 26. The remaining functionalities are similar to those described immediately above. Still, in another example, to advance the angular position, the second rotational speed could be faster than the first rotational speed; and to retard the angular position, the third rotational speed could be slower than the first rotational speed; this functionality depends on the number of teeth of the ring gears.

During these operations, the three ring gears 26, 28, 30 transmit loads to the planet gears 24. It has been found that if these loads differ from one another, the planet gears 24 can become misaligned and tip off-axis and the axes $X_2$ can become out of parallel with the axis $X_1$. To preclude these drawbacks, the planetary gear set 14 has been designed and constructed to transmit substantially balanced loads across the planet gears 24. The first ring gear 26 transmits a first load to each of the planet gears 24 across the first axial section $S_3$. The second ring gear 28 transmits a second load to each of the planet gears 24 across the second axial section $S_2$, and likewise the third ring gear 30 transmits a third load to each of the planet gears across the third axial section $S_3$. The first load may have a different magnitude than the second and third loads, and the second load may have the same magnitude as the third load. Further, as illustrated in FIG. 2, the first, second, and third axial sections $S_1$, $S_2$, and $S_3$ have axial widths that can be approximately equal to each other. And added together, the axial sections $S_1$, $S_2$, and $S_3$ can approximately equal the axial width W of the planet gears 24. As a result of at least some of these relationships, the loads transmitted to the planet gears 24 are substantially equally distributed across the planet gears 24, and misalignment does not occur and the axes $X_2$ remain parallel to the axis $X_1$. Still, the loads can be balanced by other arrangements not depicted in the figures. For instance, the second and third axial sections $S_2$, $S_3$ could have axial widths that are equal to each other but not equal to the axial width of the first axial section $S_1$. Also, when added up the axial sections $S_1$, $S_2$, and $S_3$ need not equal the axial width W of the planet gears 24, and/or the axial sections $S_1$, $S_2$, and $S_3$ could have axial spaces between them.

Since the loads are substantially balanced and misalignment does not occur, the carrier assembly 40 can be omitted from the design and construction of the phaser 10. While the carrier assembly 40 is used for other purposes, one function it provides is to maintain the alignment of the planet gears 24. Because the alignment can be maintained instead by the substantially balanced loads, the carrier assembly 40 and its plates 42, 44, cylinders 46, bolts 48, 50, pins, and other components can be altogether removed from the phaser 10 in some embodiments. Eliminating these parts means that the phaser 10 can be lighter in weight and less costly in production. Moreover, the substantially balanced loads presents opportunities for reducing the size of the sets of teeth detailed above for the different gears. In some instances, larger sets of teeth were utilized to accommodate and counteract the misalignment and tipping previously experienced. The reduced size can consequently more readily satisfy packaging demands that are oftentimes inflexible in automotive applications.

FIGS. 3-6 present another embodiment of the phaser 10. Since many components of this embodiment are similar to what has been described for the embodiment of FIGS. 1 and 2, the same reference numerals are being used in FIGS. 3-6 for the components. In this embodiment too, the phaser 10 includes the sprocket 12, the planetary gear set 14, and the plate 16. And as before, the planetary gear set 14 includes the sun gear 22, the planet gears 24, and the first, second, and third ring gears 26, 28, 30. The descriptions provided for these components with reference to the embodiment of FIGS. 1 and 2 apply for this embodiment of FIGS. 3-6 and are incorporated herein without repeating the descriptions. Only the differences between the embodiments will be described.

Figure 3:
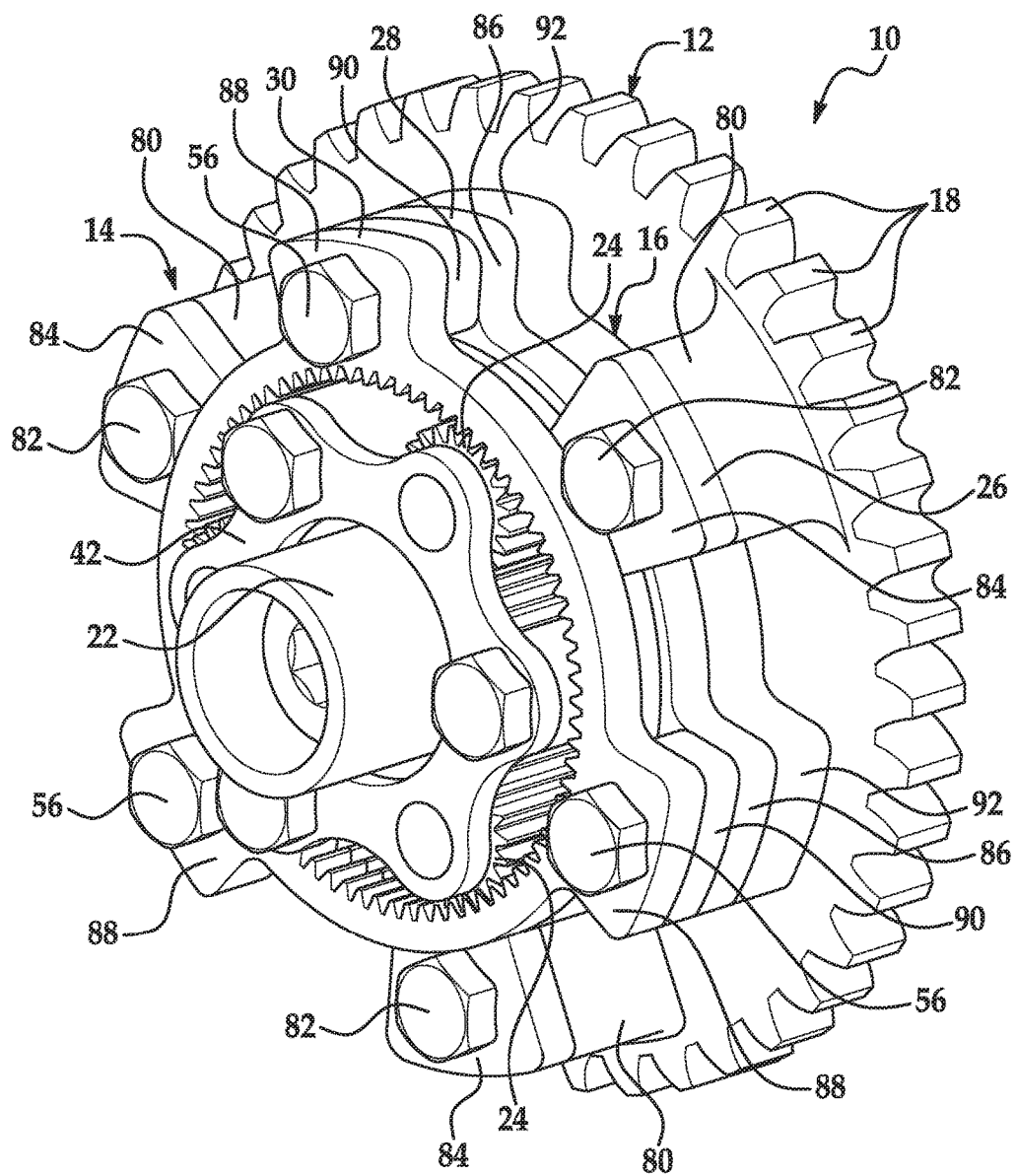
FIG. 3 is a perspective view of another embodiment of an engine variable camshaft timing phaser.
Figure 4:
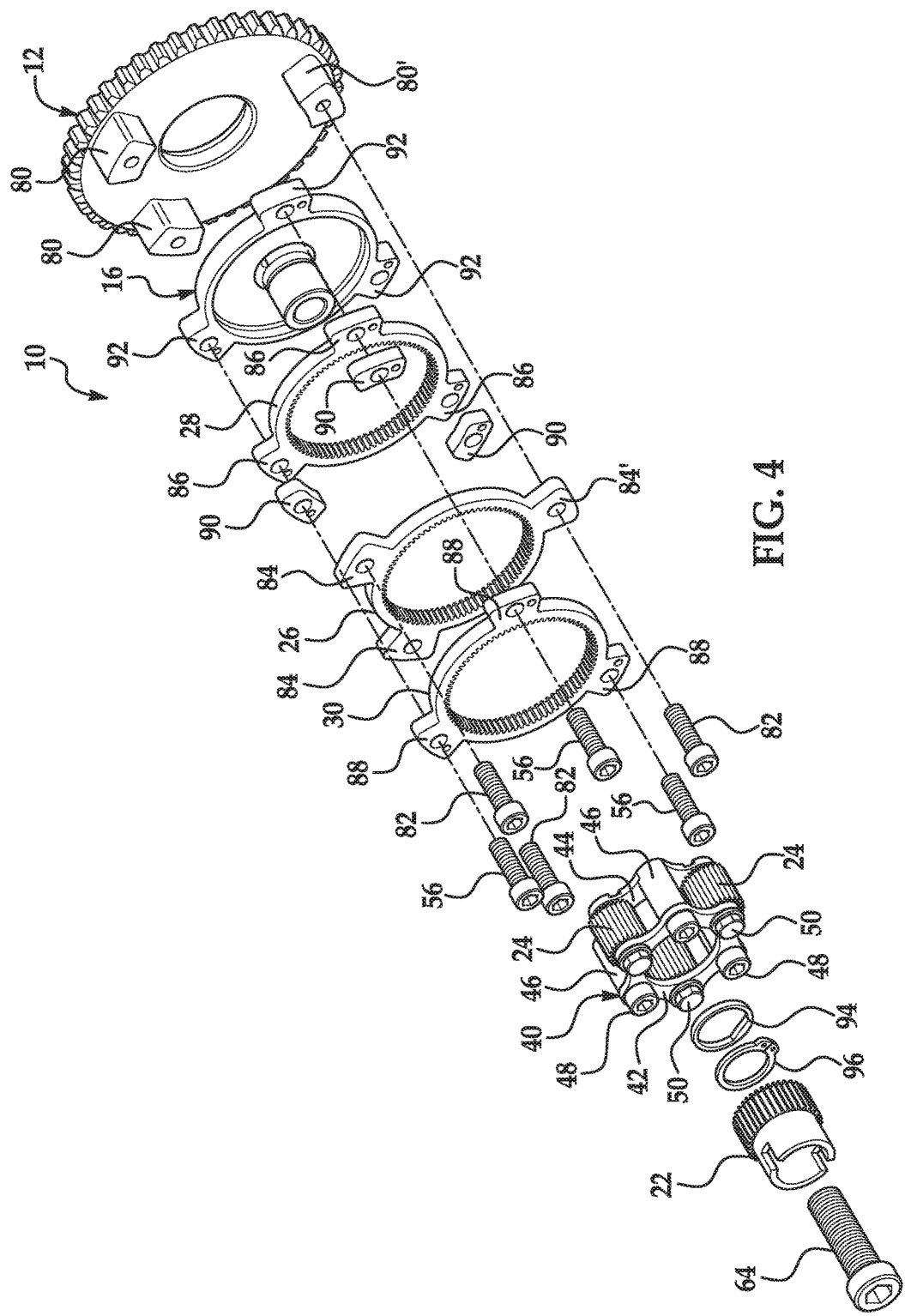
FIG. 4 is an exploded view of the engine variable camshaft timing phaser of FIG. 3.

The sprocket 12, plate 16, and ring gears 26, 28, 30 of FIGS. 3-6 are connected to one another in a different arrangement than described before. In FIGS. 3-6, the sprocket 12 has a set of three lugs 80 with internally threaded bolt holes for fastening with bolts 82. The lugs 80 are block-like structures that project axially away from a face surface of the sprocket 12. The lugs 80 are circumferentially spaced apart with respect to one another. The bolts 82 are also fastened through internally threaded bolt holes of tabs 84 of the first ring gear 26. In this way the sprocket 12 and first ring gear 26 are connected together. There are three tabs 84 to correspond to the three lugs 80. In this embodiment, the tabs 84 are rectangular unitary extensions of the first ring gear 26 and project axially outwardly away from an annular body of the first ring gear. Like the lugs 80, the tabs 84 are circumferentially spaced apart with respect to one another. The lugs 80 and tabs 84 need not be equally spaced apart around their respective circumferences. Referring particularly to FIG. 4, the lug 80' and tab 84' demarcated with the prime symbol (') are set angularly farther apart from the other two lugs 80 and tabs 84 without the prime symbol. In a specific example, the lug 80' and tab 84' are each spaced one-hundred-and-thirty-five degrees (135°) angularly apart from the lugs 80 and tabs 84 around the circumference on both of their sides. Accordingly, the neighboring lugs 80 and tabs 84 are spaced ninety degrees (90°) angularly apart with each other. Still, other examples of angular spacings are possible.

Similarly, the second ring gear 28 has a set of three tabs 86 spaced around its circumference, and the third ring gear 30 has a set of three tabs 88 spaced around its circumference. Unlike the tabs 84 of the first ring gear 26, the tabs 86 and 88 are set equally angularly apart with respect to one another around their respective circumferences. In a specific example, the tabs 86, 88 are spaced one-hundred-and-twenty degrees (120°) angularly apart from one another. Still, other examples of angular spacings are possible. Furthermore, spacers 90 can be provided for inserting between the tabs 86, 88 in installation. Since the first ring gear 26 is sandwiched by the second and third ring gears 28, 30, the spacers 90 fill the resulting gap between their tabs 86, 88 when brought over each other. The bolts 56 are fastened through internally threaded bolt holes of the tabs 86, 88 and of the spacers 90. The bolts 56 are also fastened into internally threaded bolt holes of tabs 92 of the plate 16 for connecting the second and third ring gears 28, 30 to the plate. The tabs 92 are designed and constructed similarly to the tabs 86, 88. Lastly, as illustrated in FIG. 4, the phaser 10 in this embodiment can include a snap ring 94 and a D-ring washer 96.

Figure 5:
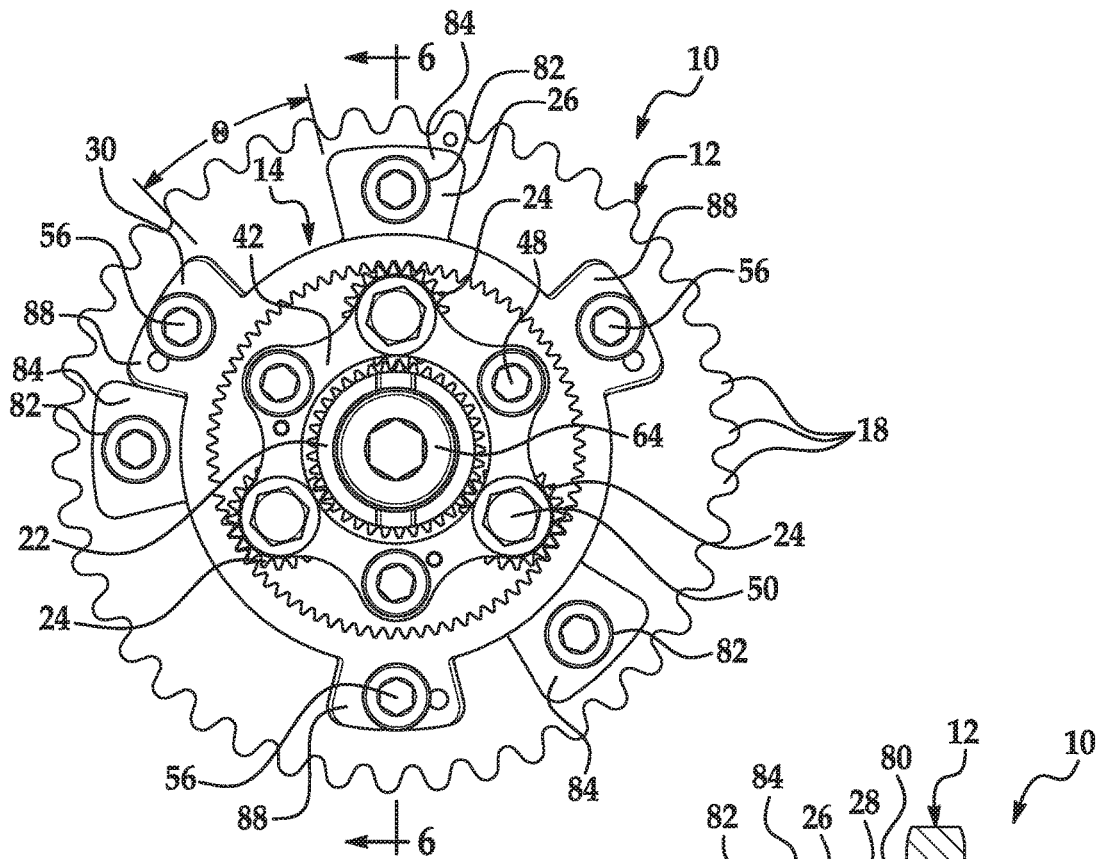
FIG. 5 is a front view of the engine variable camshaft timing phaser of FIG. 3.

As perhaps best depicted in FIGS. 3 and 5, the tabs 84 and lugs 80 are angularly offset from the tabs 86, 88, 92 and spacers 90. The angular offset accommodates angular displacement when the phaser 10 is commanded to bring the engine's camshaft to the advanced and retarded angular positions. Referring particularly to FIG. 5, in a specific example, an angular offset ⊖ between the tabs 84 and lugs 80 and the tabs 86, 88, 92 and spacers 90 can be thirty degrees (30°). This permits advanced and retarded angular positions that are at greatest thirty degrees (30°) from the normal operating position. Still, other examples of angular offsets are possible, and may depend on the placement of the different tabs and lugs, and on the desired amount of angular displacement when advancing and retarding the engine's camshaft.

Still, other embodiments of the phaser 10 are possible. For instance, two of the three ring gears could be connected to the sprocket while only one of the three ring gears is connected to the plate; this is unlike the embodiments presented in the figures in which one ring gear is connected to the sprocket and two ring gears are connected to the plate.

The foregoing description is considered illustrative only. The terminology that is used is intended to be in the nature of words of description rather than of limitation. Many modifications and variations will readily occur to those skilled in the art in view of the description. Thus, the foregoing description is not intended to limit the invention to the embodiments described above. Accordingly the scope of the invention as defined by the appended claims.

What is claimed is:

1. An engine variable camshaft timing phaser (10), comprising:
a first ring gear (26) receiving rotational drive input;
a plurality of planet gears (24) engaged with said first ring gear (26);
a sun gear (22) engaged with said plurality of planet gears (24), said sun gear (22) driven by an electric motor (32);
a second ring gear (28) engaged with said plurality of planet gears (24); and
a third ring gear (30) engaged with said plurality of planet gears (24);
wherein, in operation, relative rotational movement between said first ring gear (26) and said sun gear (22) caused by the electric motor (32) advances or retards engine valve opening and closing.

2. The engine variable camshaft timing phaser (10) as set forth in claim 1, wherein said second ring gear (28) transmits rotational drive output to an engine camshaft (62) and said third ring gear (30) is connected to the engine camshaft (62).

3. The engine variable camshaft timing phaser (10) as set forth in claim 1, wherein said second ring gear (28) transmits rotational drive output to an engine camshaft (62) and said third ring gear (30) receives rotational drive input from said first ring gear (26).

4. The engine variable camshaft timing phaser (10) as set forth in claim 1, wherein said first ring gear (26) and said plurality of planet gears (24) engage at a first axial section ($S_1$) of said plurality of planet gears (24), said second ring gear (28) and said plurality of planet gears (24) engage at a second axial section ($S_2$) of said plurality of planet gears (24), and said third ring gear (30) and said plurality of planet gears (24) engage at a third axial section ($S_3$) of said plurality of planet gears (24), said first axial section ($S_1$) situated between said second and third axial sections ($S_2$, $S_3$).

5. The engine variable camshaft timing phaser (10) as set forth in claim 4, wherein loads transmitted to said plurality of planet gears (24) from said first ring gear (26), said second ring gear (28), and said third ring gear (30) are substantially balanced across said first axial section ($S_1$), said second axial section ($S_2$), and said third axial section ($S_3$).

6. The engine variable camshaft timing phaser (10) as set forth in claim 5, wherein said first axial section ($S_1$), said second axial section ($S_2$), and said third axial section ($S_3$) have individual axial widths that are approximately equal to each other.

7. The engine variable camshaft timing phaser (10) as set forth in claim 6, wherein the sum of the individual axial widths of said first axial section ($S_1$), said second axial section ($S_2$), and said third axial section ($S_3$) is approximately equal to the axial width (W) of sets of teeth (38) of said plurality of planet gears (24).

8. The engine variable camshaft timing phaser (10) as set forth in claim 1, further comprising a plate (16) receiving rotational drive input from said second ring gear (28) and transmitting rotational drive output to an engine camshaft (62).

9. The engine variable camshaft timing phaser (10) as set forth in claim 1, further comprising a carrier assembly (40) that supports rotation of said plurality of planet gears (24), said carrier assembly (40) including a pair of plates (42, 44).

10. The engine variable camshaft timing phaser (10) as set forth in claim 1, wherein the engine variable camshaft timing phaser (10) lacks a carrier assembly for said plurality of planet gears (24), and substantially balanced loads across said plurality of planet gears (24) transmitted from said first ring gear (26), from said second ring gear (28), and from said third ring gear (30) help support the placement of said plurality of planet gears (24) in the engine variable camshaft timing phaser (10).

11. An engine variable camshaft timing phaser (10), comprising:
three ring gears (26, 28, 30), at least one of said three ring gears (26, 28, 30) receiving rotational drive input;
a plurality of planet gears (24) engaged with said three ring gears (26, 28, 30); and
a sun gear (22) engaged with said plurality of planet gears (24);
wherein loads transmitted to said plurality of planet gears (24) from said three ring gears (26, 28, 30) are substantially balanced across an axial extent of said plurality of planet gears (24), and the substantially balanced loads preclude misalignment of said plurality of planet gears (24) with respect to said three ring gears (26, 28, 30).

12. The engine variable camshaft timing phaser (10) as set forth in claim 11, wherein at least one of said three ring gears (26, 28, 30) transmits rotational drive output to an engine camshaft (62).

13. The engine variable camshaft timing phaser (10) as set forth in claim 11, wherein two of said three ring gears (26, 28, 30) have a first number of individual teeth, and the remaining one of said three ring gears (26, 28, 30) has a second number of individual teeth, said first number of individual teeth differing from said second number of individual teeth by the number of said plurality of planet gears (24) or by a multiple thereof.

14. The engine variable camshaft timing phaser (10) as set forth in claim 11, wherein the engine variable camshaft timing phaser (10) lacks a carrier assembly for said plurality of planet gears (24), and the substantially balanced loads across the axial extent of said plurality of planet gears (24) help support the placement of said plurality of planet gears (24) in the engine variable camshaft timing phaser (10).

15. An engine variable camshaft timing phaser (10), comprising:
a first ring gear (26) receiving rotational drive;
a plurality of planet gears (24) making teeth-to-teeth meshing with said first ring gear (26);
a sun gear (22) making teeth-to-teeth meshing with said plurality of planet gears (24), said sun gear (22) driven by an electric motor (32);
a second ring gear (28) making teeth-to-teeth meshing with said plurality of planet gears (24);
a third ring gear (30) making teeth-to-teeth meshing with said plurality of planet gears (24); and
a plate (16) receiving rotational drive input from said second ring gear (28) and from said third ring gear (30), and said plate (16) transmitting rotational drive output to an engine camshaft (62);
wherein said first ring gear (26) and said plurality of planet gears (24) mesh at a first axial section ($S_1$) of said plurality of planet gears (24), said second ring gear (28) and said plurality of planet gears (24) mesh at a second axial section ($S_2$) of said plurality of planet gears (24), and said third ring gear (30) and said plurality of planet gears (24) mesh at a third axial section ($S_3$) of said plurality of planet gears (24), said first axial section ($S_1$) situated between said second and third axial sections ($S_2$, $S_3$);
wherein, in order to angularly displace the engine camshaft (62) in a first direction relative to said first ring gear (26), the electric motor (32) drives said sun gear (22) at a greater rotational speed than said first ring gear (26), and in order to angularly displace the engine camshaft in a second direction relative to said first ring gear (26), the electric motor (32) drives said sun gear (22) at a lesser rotational speed than said first ring gear (26).

\* \* \* \* \*